United States Patent [19]

Shida et al.

[11] 4,241,434
[45] Dec. 23, 1980

[54] STEPPING MOTOR MECHANISM FOR AN ELECTRONIC WATCH

[75] Inventors: Masaharu Shida; Akira Torisawa; Makoto Ueda, all of Tokyo, Japan

[73] Assignee: Kabushiki Kaisha Daini Seikosha, Tokyo, Japan

[21] Appl. No.: 915,179

[22] Filed: Jun. 14, 1978

[30] Foreign Application Priority Data

Jun. 17, 1977 [JP] Japan .................................. 52-72572

[51] Int. Cl.³ .................... G04C 19/00; G04C 3/00; H02K 29/00
[52] U.S. Cl. .................................... 368/85; 368/217; 318/138; 318/696
[58] Field of Search ............... 58/23 R, 23 D, 23 AC, 58/23 A; 310/40 R, 40 MM, 49 R; 318/138, 65, 254, 281, 289, 293, 431, 439, 696

[56] References Cited

U.S. PATENT DOCUMENTS

| 4,055,785 | 10/1977 | Nakajima et al. | 318/138 |
|---|---|---|---|
| 4,066,947 | 1/1978 | Nakajima et al. | 318/696 |
| 4,070,592 | 1/1978 | Snowdon et al. | 310/49 |
| 4,112,671 | 9/1978 | Kato et al. | 58/23 D |
| 4,126,796 | 11/1978 | Ito | 310/40 MM |
| 4,129,981 | 12/1978 | Nomura et al. | 58/23 D |
| 4,150,536 | 4/1979 | Nakajima et al. | 58/23 D |

Primary Examiner—Vit W. Miska
Attorney, Agent, or Firm—Robert E. Burns; Emmanuel J. Lobato; Bruce L. Adams

[57] ABSTRACT

An electronic timepiece includes a stepping motor having a coil and a rotor. Circuitry is provided for generating and applying alternating pulses to the motor coil to effect forward stepwise rotation of the motor rotor in a forward direction and for generating and applying alternating pulses to the motor coil to effect reverse stepwise rotation of the motor rotor in a reverse direction. The reverse rotation is achieved by sets of three alternating pulses with the first pulse of each set effecting incremental angular movement of the motor rotor in the forward direction followed by the second and third pulses which effect greater icremental angular movement of the motor rotor in the reverse direction to thereby obtain for each pulse set a net angular movement of the motor rotor in the reverse direction.

8 Claims, 22 Drawing Figures

FIG. 4(a) FIG. 4(b) FIG. 5(a)
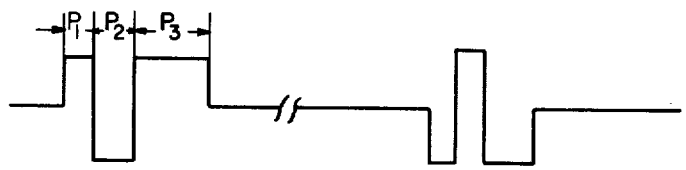
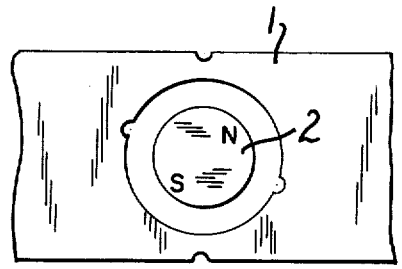
FIG. 5(b) FIG. 5(c)
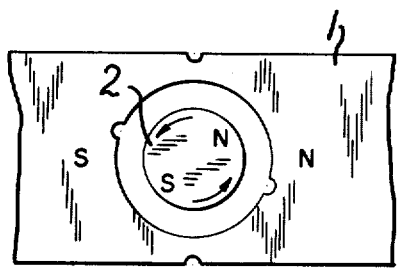
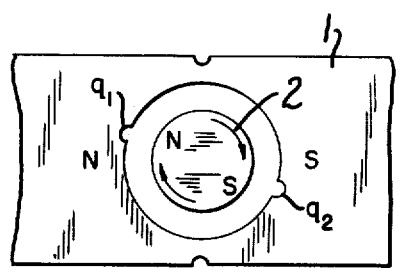
FIG. 5(d) FIG. 5(e)
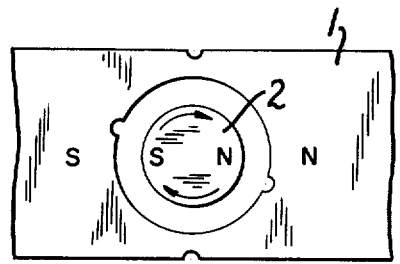
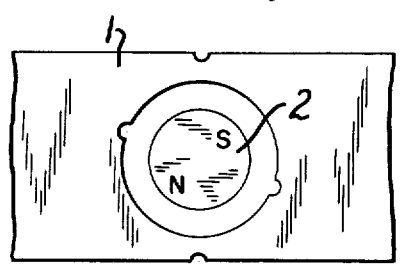
FIG. 8 FIG. 6
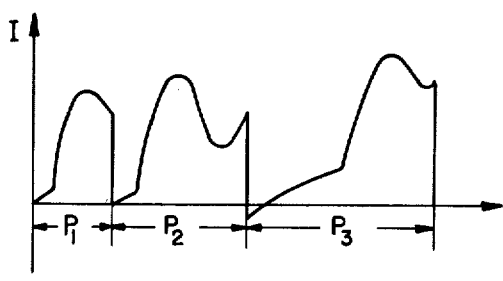
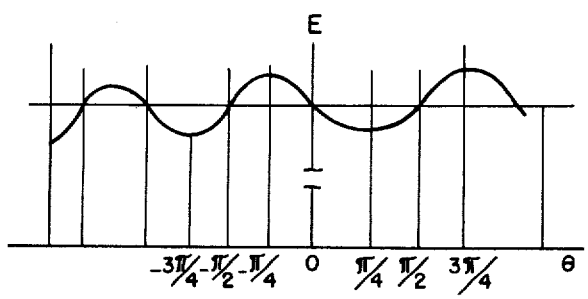

1

STEPPING MOTOR MECHANISM FOR AN ELECTRONIC WATCH

BACKGROUND OF THE INVENTION

The present invention relates to a device for controlling the rotor rotation of a stepping motor for an electronic watch.

FIGS. 1(a) and 1(b) show a flat plan view and a side view of one embodiment of stepping motor used for analog type electronic wrist watches. In order to rotate a rotor 2 in a predetermined direction by using a drive pulse of alternating polarity, such type stepping motor conventionally uses a magnetic or mechanical index means by which the direction of the rotor rotation is maintained in one direction.

In recent years, however, in the electronic wrist watch, a reversible stepping motor has been required in order that many functions, such as, time correction or correction of the difference in time, can be achieved electrically.

In the prior art, some reversing drive techniques have been proposed, such as, a technique for moving the direction of the index mechanically, or a technique which comprises detecting the position of the rotor by using a current waveform or the like, and selectively adding a pulse which changes its polarity at the precise time to obtain reverse drive. However, these techniques are not suitable for mass-production of electronic timepieces. Furthermore, it is difficult to achieve high-reliability rotor reversal without a decrease in performance at the time of rotor rotation.

The basic object of the present invention is to provide a device for controlling the rotor rotation of a stepping motor for an electric watch and which can be driven by a single coil.

BRIEF DESCRIPTION OF THE DRAWINGS

FIGS. 4a and 4b show examples of a reverse rotation driving voltage waveform according to the present invention, FIGS. 5a, 5b, 5c, 5d and 5e are explanatory diagrams showing when the stepping motor rotates in the reverse direction, FIG. 6 is a graph representing the relationship between the rotation angle of the rotor and the magnetic energy, FIG. 8 shows an example of the reverse driving current waveform according to the present invention.

The principle of rotation of a rotor of a stepping motor mechanism for an electronic watch according to the present invention will now be described.

Figure 1A:
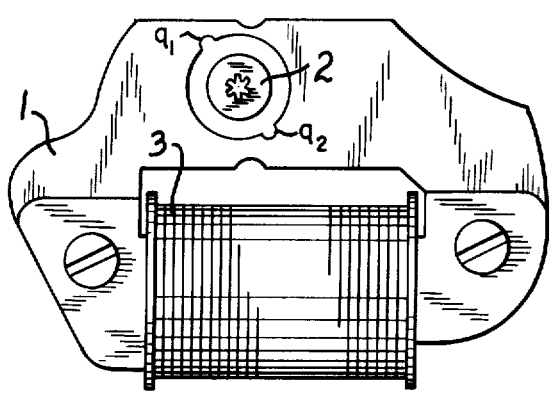
FIGS. 1a and 1b show a flat plan view and side view of a type stepping motor, respectively.
Figure 1B:
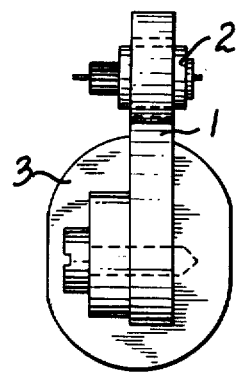
Figure 2A:
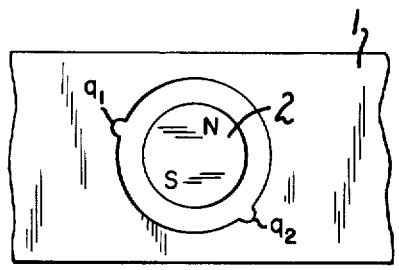
FIGS. 2a, 2b, 2c and 2d are explanatory diagrams showing when the stepping motor rotates in the forward direction.
Figure 2B:
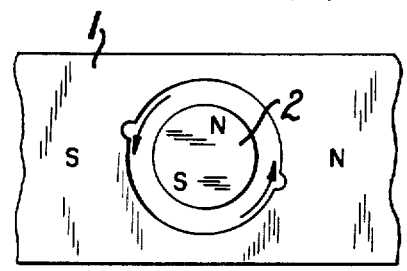
Figure 2C:
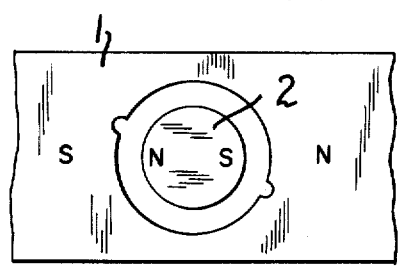
Figure 2D:
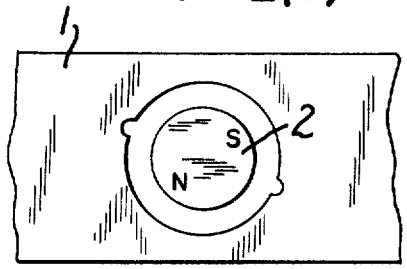
Figure 3A:
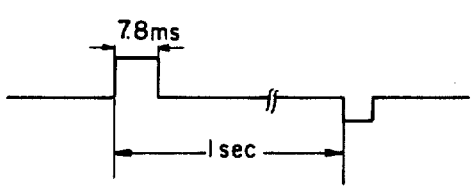
FIGS. 3a and 3b show examples of a driving voltage waveform and a coil current waveform, respectively, of the stepping motor.
Figure 3B:

FIG. 2 shows the condition of the motor when the rotor is rotating in the forward direction. A voltage which changes a pulse direction every one second and has the width of 7.8 ms, as shown in FIG. 3a, is applied to the motor. FIG. 2a shows the position of the rotor 2 at the time when no voltage is applied to the motor. The stationary position of the rotor is determined by the recesses or notches $q_1$ and $q_2$. In FIG. 2b, the condition is shown in which magnetic poles are produced in a stator 1 by applying voltage to the motor, and as a result, a magnetic repulsion force is applied to the rotor 2. If the current applied to the motor is interrupted when the rotor comes to the position as shown in FIG. 2c, the rotor 2 comes to rest at the position shown in FIG. 2d which is advanced 180° from the position shown in FIG. 2a. After this, the rotor 2 repeats the same movement and continues to rotate in a predetermined direction, that is, in the forward direction, by periodically changing the polarity of the voltage applied to the motor.

Next, the principle of reverse rotation of the rotor 2 will be explained. For this purpose, sets of three pulses which change alternately in their polarity or direction as shown in FIG. 4a are applied successively to the motor.

Figure 7:
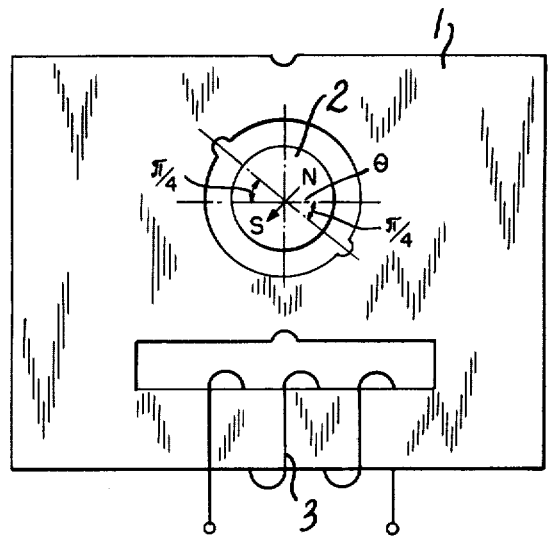
FIG. 7 is an explanatory diagram of the stepping motor.

FIG. 5a shows the condition wherein the rotor 2 is at rest or stand still. In this figure, the forward rotating direction of the rotor 2 is counter-clockwise. A first pulse $P_1$ is applied to the motor in order to rotate or angularly advance the rotor 2 in the forward direction. FIG. 5b shows this condition. Next, when the N pole of the rotor 2 comes near to the notch $q_1$ (and the S pole nears the notch $q_2$), the magnetic poles N and S are produced in the stator 1 as shown in FIG. 5c. This is the condition at the time of applying the pulse $P_2$ to the motor. At this time, the rotor is forced in the clockwise by the pulse $P_2$, and as a result, the rotor rotates in the opposite or reverse direction to the direction before that time. When the rotor 2 comes near to the position shown in FIG. 5d, a pulse $P_3$ which is different in direction or polarity from the pulse $P_2$ is applied to the motor. The FIG. 6 shows the relationship between the position of the rotor 2 and the total magnetic energy of the motor (when no voltage is applied to the motor), and FIG. 7 shows the reference position of the rotor 2. In this case, the forward direction of rotation of the rotor 2 is defined as the positive direction of $\theta$, the reverse direction of rotation of the rotor 2 is defined as the negative direction of $\theta$, and assumption is made that the rotor 2 was stationed at the position where the angle of $\theta$ is $\pi/4$. The rotor 2 is driven in the positive direction of $\theta$ by the pulse $P_1$. Next, when $\theta$ becomes $3\pi/4$ approximately, the rotor 2 is driven in the negative direction of $\theta$ by the pulse $P_2$. When $\theta$ becomes zero approximately, the rotor possesses large kinetic energy due to the force obtained by the pulse $P_2$ and some potential energy obtained at the time when the magnetic energy decreases. By applying the pulse $P_3$ to the rotor in the direction shown in FIG. 5d, the rotor is driven in the negative direction of $\theta$, and as a result, the rotor continues to rotate. After the pulse $P_3$ is interrupted, the rotor 2 travels from the position shown in FIG. 5a by $-\pi$ and momentarily comes to rest. By the series of operations described above, the reverse rotation of the rotor 2 is finished. When rotating the rotor 2 in the reverse direction after this, the direction of the set of pulses $P_1$, $P_2$ and $P_3$ should be changed in the opposite direction as shown in FIG. 4b. FIG. 8 shows the current waveform in the condition of the reverse rotation of the rotor 2.

Figure 9:
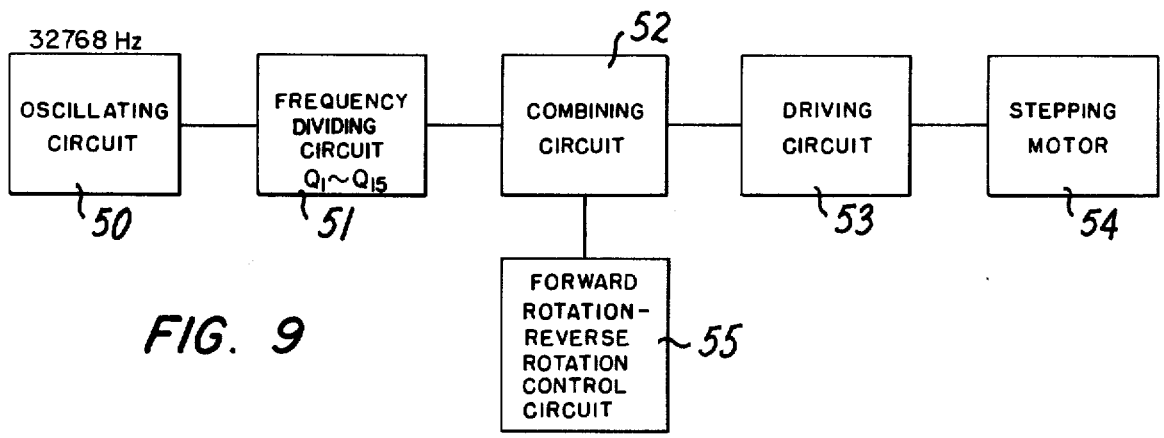
FIG. 9 is a block diagram of the present invention.

FIG. 9 shows a block diagram of an embodiment according to the present invention. An oscillating circuit 50 is an oscillating circuit in which, generally, a quartz crystal having a vibrating frequency of 32768 Hz is used, and the output signal from the oscillating circuit 50 is applied to a frequency dividing circuit 51. The frequency dividing circuit 52 is constructed of fifteen-stage flip-flop stages (referred to as F.F. hereinafter) which divide the high frequency output signal to a 1 Hz signal. A combining circuit 52 combines from each flip-flop of the frequency dividing circuit the pulses necessary for rotating the rotor in the forward direction or the reverse direction. At the same time, the forward rotation pulse or the reversing rotation pulse is applied to a driving circuit 53 by a signal from a forward rotation-reverse rotation control circuit 55 and a stepping motor 54 is driven by the driving circuit 53.

Figure 10:
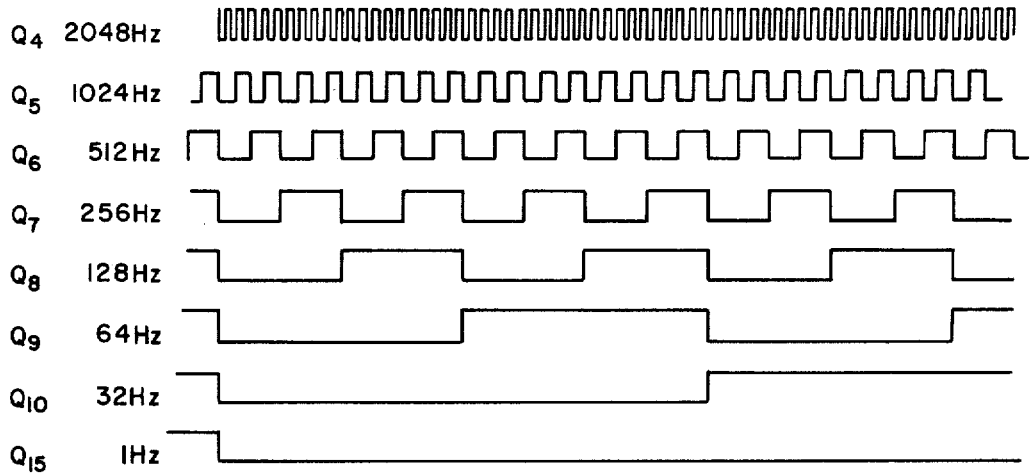
FIG. 10 shows a time chart of one embodiment of the present invention.
Figure 10:
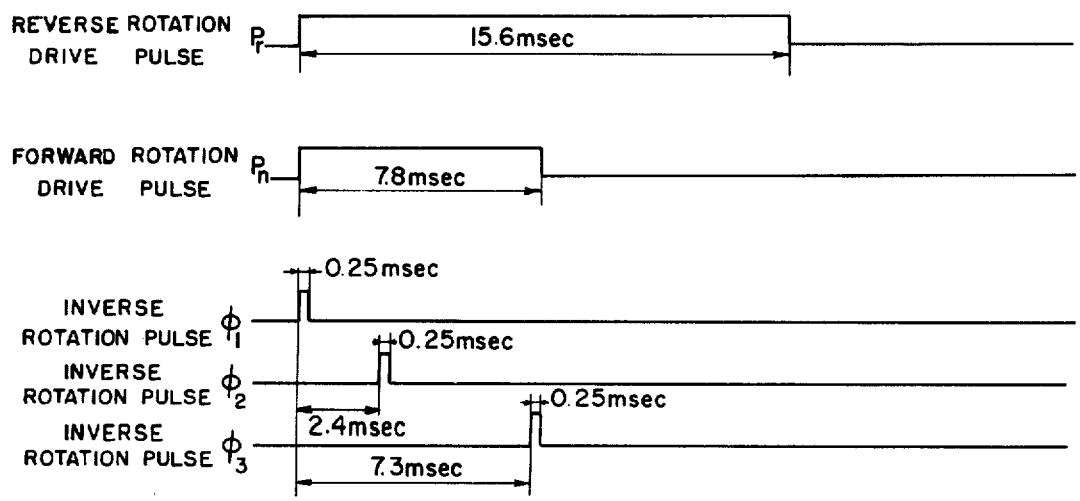

FIG. 10 shows a set of time charts of the frequency dividing circuit 51 and of the combining circuit 52.

The combining circuit 52 combines reverse driving pulse $P_r$, forward driving pulse $P_n$ and inverse pulses $\phi_1$, $\phi_2$ and $\phi_3$ respectively.

These pulses can be represented by the following equations:

$$P_r = \overline{Q}_{10} \cdot \overline{Q}_{11} \cdot \overline{Q}_{12} \cdot \overline{Q}_{13} \cdot \overline{Q}_{14} \cdot \overline{Q}_{15}$$

$$P_n = \overline{Q}_9 \cdot P_r$$

$$\phi_1 = \overline{Q}_4 \cdot \overline{Q}_5 \cdot \overline{Q}_6 \cdot \overline{Q}_7 \cdot \overline{Q}_8 \cdot P_n$$

$$\phi_2 = \overline{Q}_4 \cdot Q_5 \cdot \overline{Q}_6 \cdot \overline{Q}_7 \cdot \overline{Q}_8 \cdot P_n$$

$$\phi_3 = Q_4 \cdot Q_5 \cdot Q_6 \cdot Q_7 \cdot Q_8 \cdot P_n$$

Figure 11A:
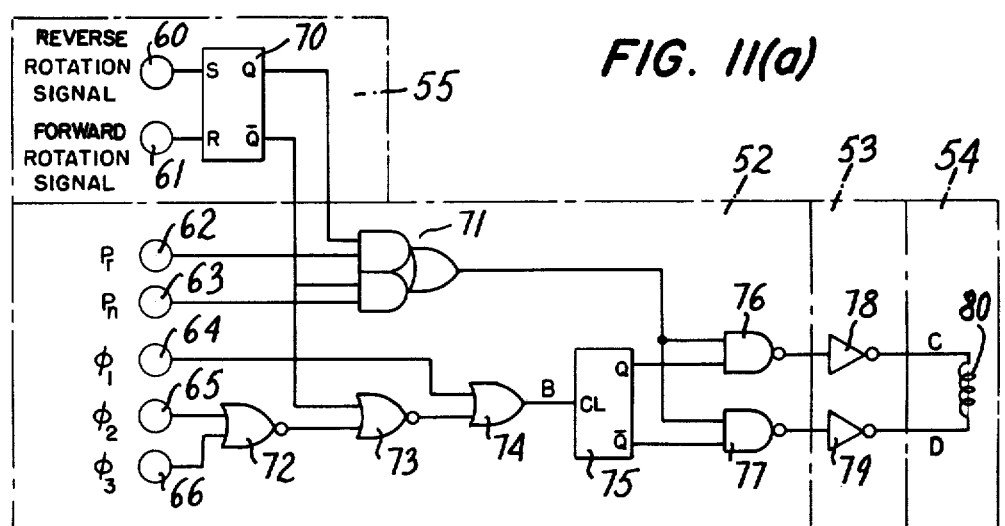
FIGS. 11a and 11b show a detailed construction diagram of the embodiment shown in block form in FIG. 9 and a time chart thereof, respectively.

As shown in FIG. 11a, the forward rotation-reverse rotation control circuit 55 comprises RS Flip-Flop 70, the reset input of which is connected to a normal rotation signal terminal 61 and the set input of that is connected to a reverse rotation signal terminal 60. An output Q of the RS-F·F is applied to a first AND gate of an AND·OR gate 71 and an output $\overline{Q}$ of the RS-F·F is applied to a second AND gate of the AND·OR gate 71 and to one input of a NOR gate 73. An input 65 for the inverse pulse $\phi_2$ and an input 66 for the inverse pulse $\phi_3$ are applied to a NOR gate 72, an output of the NOR gate 72 is applied to NOR gate 73 and an output of the NOR gate 73 is applied to an OR gate 74. An input 64 for the reverse pulse $\phi_1$ is applied to the OR gate 74 and the output of the OR gate 74 is applied to a clock terminal CL of a F·F 75.

The output Q of the F·F 75 is applied to a NAND gate 76 and the output $\overline{Q}$ for the F·F 75 is applied to a NAND gate 77. An input 62 for the reverse driving pulse $P_r$ is applied to the first AND gate of the AND·OR gate 71, an input 63 for the forward driving pulse $P_n$ is applied to the second AND gate and the output of the AND·OR gate 71 is applied to the NAND gates 76 and 77.

The output of the NAND gate 76 is connected to one side of a coil 80 of the stepping motor through a driving inverter 78. The output of the NAND gate 77 is connected to the other side of the coil 80 of the stepping motor through a driving inverter 79.

The operation of the circuit will be explained with reference to FIGS. 11a and 11b. In the normal condition, the forward rotation signal terminal 61 of the RS-F·F 70 is in the condition of "H" level, as a result, $\overline{Q}$ is in the condition of "H" level. In this case, the operation is made according to the time chart of the forward rotation in FIG. 11b.

The output of the AND OR gate 71 is applied to the NAND gates 76 and 77 as a forward rotation driving pulse, and either side C or D of the coil 80 becomes "H" level and the other one becomes "L" level depending on the condition of the F·F 75, and a current flows through the coil 80. Since an input signal B is applied to the F·F 75 synchronism with the forward driving pulse $P_n$, the F·F 75 changes output states every one second.

Next, the operation in the case of reverse rotation will be explained.

When the reverse signal input 60 becomes "H" level, Q becomes "H" level and the output signal at the output of the AND·OR gate 71 becomes the reverse rotation driving pulse $P_r$. As a result, the reverse rotation driving pulse $P_r$ is applied to the coil 80.

Figure 11B:
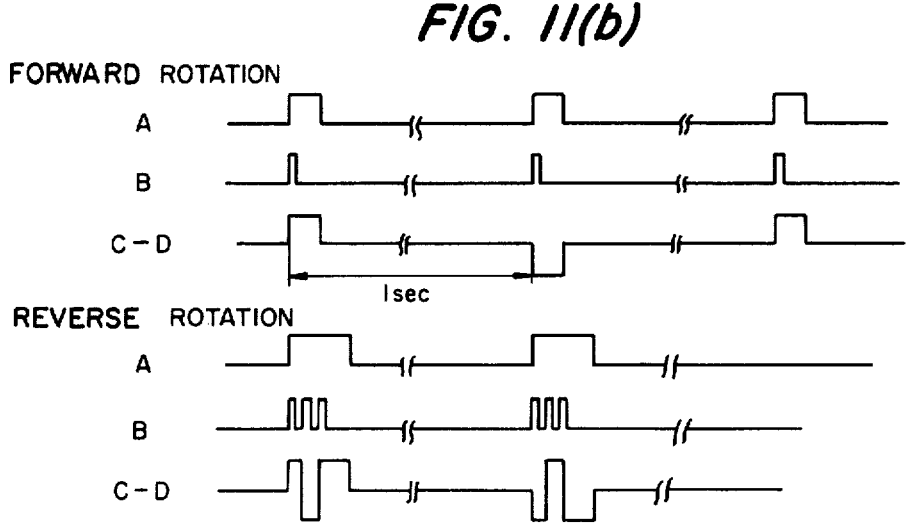

On the other hand, when driving in the reverse direction, reverse pulses $\phi_1$, $\phi_2$ and $\phi_3$ are applied to the F·F 75 as an input signal B as shown in FIG. 11b, and the F·F 75 is changed at each application of the signal $\phi$. Therefore, the signal flowing through the coil 80 is as shown in the time chart as the C-D signal.

In this embodiment, $P_1$ has a pulse width of 2.4 msec, $P_2$ has a pulse width of 4.9 msec and $P_3$ one of 8.3 msec.

As described above, according to the present invention, only a slight change of the electric circuit is required without changing the mechanical portions, and therefore, the cost increase for this change is small. Furthermore, according to the present invention, since the reverse rotation inertia force of the rotor is increased by pulses $P_1$ and $P_2$, a driving voltage is accordingly decreased. Therefore, even if the driving force produced by the coil is decreased, the reverse rotation driving can be performed under stable condition and the reverse rotation torque is large.

In one actual embodiment of the stepping motor in which the material of the rotor is Samarium-Cobalt, the outer diameter of the rotor is 1.3 mm, the inner diameter of the rotor is 0.7 mm, the thickness of the rotor is 0.6 mm, the inner diameter of the stator is 2 mm, the resistance of the coil is 2.25 KΩ and the number of turns is 7300, when the pulse width of $P_1$ is 2.4 msec, the pulse width of $P_2$ is 4.9 msec and the pulse width of $P_3$ is 8.3 msec, it was confirmed by experimentation that the range of the operable voltage was from 1.1 V to 2.0 V. It was also confirmed that the range of that was the extent from 1.3 V to 1.8 V even taking into account the non-uniformity of the motor characteristics due to mass-production techniques.

The present invention is applicable to any stepping motor which has a single coil driven by an alternating drive pulse, irrespective of the shape of the motor, etc. Since the present invention is of wide application, a striking effect can be obtained. It is apparent that the present invention is applicable to the other type motors, such as a motor having a coreless coil, and the application of the present invention is not limited to the particular motor construction shown in the described embodiment.

We claim:

1. A stepping motor apparatus for an electronic watch of the type having a rotor rotated in the forward direction by alternating pulses, said stepping motor apparatus comprising: a generating circuit for generating at least three alternating pulses including a first pulse having a pulse width of 1.5 to 2.5 msec, a second pulse having a pulse width about twice as long as said first pulse width and a third pulse having a pulse width more than three times as long as said first pulse width; and means including a forward rotation-reverse rotation control circuit for controlling the application of the at least three alternating pulses to effect rotation of said rotor in the reverse direction such that said first pulse rotates said rotor in the forward direction, and said second and third pulses are applied at the time of angular movement of said rotor to cause said rotor to rotate in the reverse direction.

2. In combination: a stepping motor having a coil and a rotor: means for generating and applying alternating pulses to the motor coil to effect forward stepwise rotation of the motor rotor in a forward direction; and means for generating and applying alternating pulses to said motor coil to effect reverse stepwise rotation of said motor rotor in a reverse direction including means for generating time-spaced sets of at least three alternating pulses and applying the sets of three alternating pulses to said motor coil such that at least two pulses of each set are applied during periods of angular movement of said motor rotor to effect reverse stepwise rotation of said motor rotor, said means for generating sets of at least three alternating pulses including means for generating sets of at least three alternating pulses with successive ones of the alternating pulses of each set having successively longer pulse widths.

3. The combination according to claim 2; wherein within each pulse set the first pulse has a pulse width of about 2 msec, the second pulse has a pulse width about twice as long as the first pulse width, and the third pulse has a pulse width about twice as long as the second pulse width.

4. The combination according to claims 2 or 3; wherein said means for generating and applying sets of at least three alternating pulses includes a forward rotation-reverse rotation control circuit for controlling the direction of rotation of said motor rotor.

5. The combination according to claims 2 or 3; wherein said means for generating and applying sets of at least three alternating pulses includes means for generating and applying the first pulse of each set to effect incremental angular movement of said motor rotor in the forward direction followed by the second and third pulses to effect greater incremental angular movement of said motor rotor in the reverse direction to thereby obtain for each pulse set a net angular movement of said motor rotor in the reverse direction.

6. The combination according to claim 5; wherein the first pulse of each set effects incremental angular movement of said motor rotor in the forward direction about $\pi/2$ radian from the previous motor rotor rest position, and the second and third pulses effect incremental angular movement of said motor rotor in the reverse direction about $3\pi/2$ radians to thereby effect for each pulse set a net angular movement of said motor rotor of about $\pi$ radian in the reverse direction.

7. The combination according to claim 5; further including an electronic timepiece having time-indicating means driven by said stepping motor for indicating time.

8. The combination according to claim 2; wherein within each pulse set the first pulse has a pulse width of 1.5 to 2.5 msec, the second pulse has a pulse width about twice as long as the first pulse width, and the third pulse has a pulse width more than three times as long as the first pulse width.

* * * * *